United States Patent [19]

LaPine et al.

[11] 4,008,508
[45] Feb. 22, 1977

[54] METHOD AND APPARATUS FOR PROCESSING SHRIMP AND THE LIKE

[75] Inventors: Robert L. LaPine, Wells, Mich.; Melvin J. Crepeau, St. Petersburg, Fla.

[73] Assignee: Harry H. Bell & Sons, Inc., St. Petersburg, Fla.

[22] Filed: May 19, 1975

[21] Appl. No.: 578,740

[52] U.S. Cl. .................................. 17/52; 17/71
[51] Int. Cl.$^2$ .................................. A22C 29/00
[58] Field of Search ............ 17/72, 71, 73, 48, 51, 17/52, 24, 56, 57; 15/3.13, 3.16

[56] References Cited

UNITED STATES PATENTS

| | | | |
|---|---|---|---|
| 2,325,680 | 8/1943 | Hunt | 17/57 |
| 2,845,654 | 8/1958 | Deal | 17/72 |
| 3,495,293 | 2/1970 | Tolley | 17/71 |
| 3,566,437 | 3/1971 | Jonsson | 17/72 |
| 3,703,746 | 11/1972 | Jones, Jr. | 17/71 |
| 3,867,740 | 2/1975 | LaPine et al. | 17/72 |

OTHER PUBLICATIONS

*Shetland Gutting Machine*, World Fishing, Sept. 1969.

*Primary Examiner*—Louis G. Mancene
*Assistant Examiner*—James D. Hamilton
*Attorney, Agent, or Firm*—Michael, Best & Friedrich

[57] ABSTRACT

De-headed and unshelled shrimp are automatically processed by apparatus including a feed station, an uncurling station, a cutting station, a flattening or spreader station, a cleaning station and a pair of endless conveyor belts which are supported on guides to form a generally V-shaped trough for receiving the shrimp and continuously moving it from the feed station and through the other stations. The uncurling station includes a plurality of leaf members which resiliently engage the underside of the shrimp as it passes thereunder and cause it to be uncurled to a substantially horizontally extended position prior to entering the cutting station. At the cutting station a rotating cutter blade cuts through the belly of the shrimp to the point at which the alimentary canal is located. The spreader station includes a stationary spreading element having a progressively broadening V-shaped cross section and adapted for spreading portions of the shrimp on the opposite sides of the cut to thereby cause the shrimp to assume a substantially flattened or butterfly position. The flattened shrimp is then moved through a first stage spray assembly where a flow of pressurized cleaning fluid is directed onto the exposed surface of the shrimp to purge or flush away loose debris. Following this initial cleaning, the central, exposed portion of the flattened shrimp is contacted by the outer peripheral surface of the rotating cleaning wheel having a plurality of circumferentially spaced cavities. Finally, the shrimp is moved beneath a second stage spray assembly for final purging or flushing with a pressurized cleaning fluid.

46 Claims, 15 Drawing Figures

METHOD AND APPARATUS FOR PROCESSING SHRIMP AND THE LIKE

BACKGROUND OF THE INVENTION

This invention relates to a method and apparatus for processing shrimp, fish and the like. In one aspect the invention relates to a method and apparatus for processing so-called Rock Shrimp which has been de-headed but the shell is still attached.

Rock Shrimp (i.e., *Sicyonia Breviorstris*, a member of the Penaeidae family) is a species of shrimp which has a very hard shell. Even though the flesh or meat of Rock Shrimp is quite tasty, there has been little or no commercial market therefor, primarily because of the limited availability of apparatus capable of automatically processing it at reasonable production rates. U.S. Pat. No. 3,867,740, issued Feb. 25, 1975, discloses a method and apparatus for automatically processing Rock Shrimp. The present invention provides improvements to the method and apparatus disclosed in that patent, particularly with regard to the effectiveness of removing all extraneous debris from the shrimp, such as the sand vein or alimentary canal, roe and the like.

SUMMARY OF THE INVENTION

A primary object of the invention is to provide an improved method and apparatus for enviscerating shrimp, fish and the like, particularly hard shelled shrimp, such as Rock Shrimp.

Another object of the invention is to provide a method and apparatus for automatically processing Rock Shrimp which is capable of effectively removing substantially all of the extraneous debris from the shrimp.

Other objects, aspects and advantages of the invention will become apparent upon reviewing the following detailed description, the drawings and the appended claims.

The processing apparatus provided by the invention, while adaptable for enviscerating fish, is particularly adaptable for processing shrimp. For this purpose, the apparatus includes a cutting station having a cutter means for cutting through the belly of de-headed and unshelled shrimp to the sand vein or alimentary canal of the shrimp, a spreader station having a spreader means for spreading the portions of the shrimp on the opposite side of the cut and thereby causing the shrimp to assume a substantially flattened or so-called butterfly position with the shell remaining attached and the alimentary canal exposed, and a cleaning station including a rotating cleaning wheel means having an outer peripheral surface for engaging the central portion of the flattened shrimp in the vicinity of the exposed alimentary canal and a plurality of circumferentially spaced cavities in the outer peripheral surface. As the cleaning wheel means rotates relative to the shrimp, the cavities provide a gentle rubbing and pulling action on extraneous debris, tending to sever or loosen same without causing any substantial damage to the meat or flesh. A conveyor means, preferably in the form of a pair of endless conveyor belts supported on guide means to form a generally V-shaped trough, continuously moves the shrimp through the cutter, spreader and cleaning stations.

The apparatus preferably includes an uncurling station having uncurling means for engaging the underside of the shrimp and uncurling it to a substantially horizontally extended position as it is moved therethrough by the conveyor means towards the cutting station. The cleaning station preferably includes at least one cleaning fluid means for directing a pressurized flow of cleaning fluid onto the exposed surface of the flattened shrimp after it passes through the spreader station.

BRIEF DESCRIPTION OF THE DRAWINGS

FIG. 8 is an enlarged, fragmentary side elevational view of the cutting and spreader stations;

DESCRIPTION OF THE PREFERRED EMBODIMENTS

The invention is particularly adaptable for processing de-headed and unshelled Rock Shrimp and will be illustrated and described for this use. However, the invention also can be adapted to process other types of shrimp and to enviscerate fish.

Figure 1:
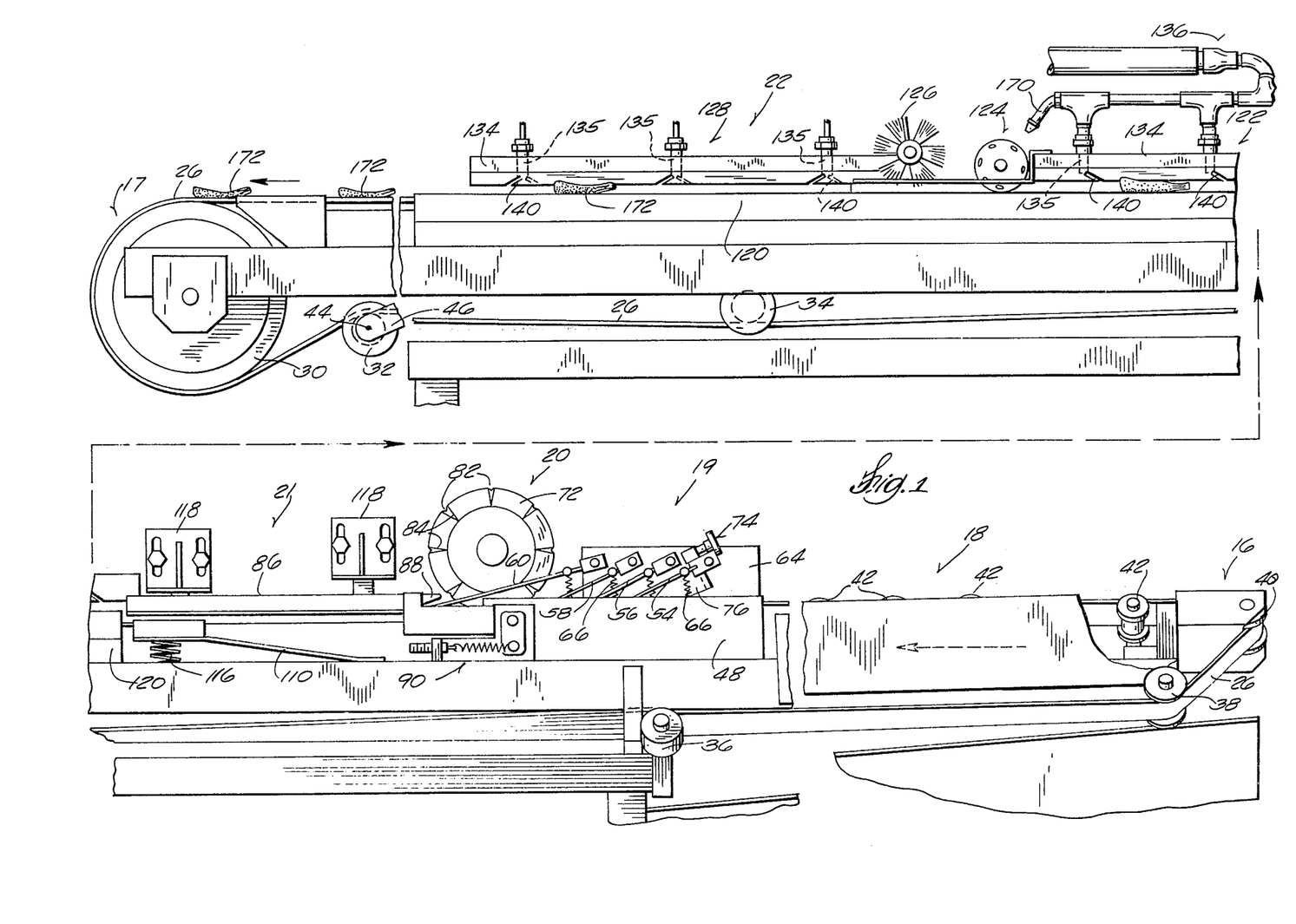
FIG. 1 is a side elevation view, partially broken away, of shrimp processing apparatus embodying various of the features of the invention, shown broken into two sections for convenience of illustration.
Figure 3:
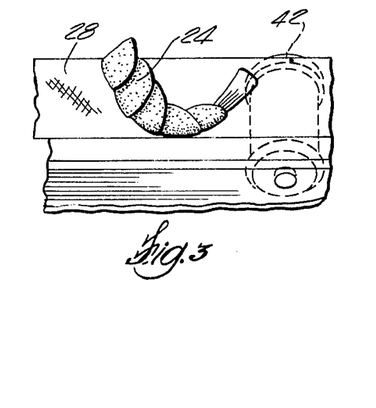
FIG. 3 is a fragmentary, sectional view taken along the line 3—3 in FIG. 2.

Referring to the drawings, FIG. 1 shows a side elevation view, broken into two sections for convenience of illustration, of the overall apparatus which has an inlet end 16 and an outlet end 17. The apparatus is comprised of five stations, namely, a feed station 18, an uncurling station 19, a cutting station 20, a flattening or spreader station 21 and a cleaning station 22. De-headed and unshelled shrimp 24, like that shown in FIG. 3, are introduced into the apparatus at the feed station 18 and each shrimp 24 is sequentially and continuously moved from the feed station 18 through the uncurling station 19, through the cutting station 20, through the spreader station 21, through the cleaning station 22 and finally discharged from the outlet end 17 by a conveyor means comprised of a pair of endless belts 26 and 28 located on the opposite sides of the longitudinal center line of the apparatus.

The belts 26 and 28 are trained over a drive pulley 30 located at the outlet end 17, a belt tightening roller 32, a plurality of identical pairs of belt biasing rollers 34, 36 and 38 (one of each pair shown in FIG. 1), an identical pair of idler rollers 40 located at the inlet end 16 (See FIG. 2) and a plurality of identical pairs of longitudinally spaced support or guide rollers 42 located in the feed station 18 (one of each pair shown in FIG. 1).

The drive pulley 30 is mounted on a stationary axis and is driven by a suitable drive means (not shown), such as an electric motor. The belts 26 and 28 are generally flat with their inner edges generally juxtaposed during movement around the drive pulley 30 and over the belt tightening roller 32 which is mounted on a suitable means for adjusting the degree of tension on the belt. In the specific embodiment illustrated, the belt tightening roller 32 is rotatably mounted on a shaft 44 carried by at least one arm 46 which is swingably mounted and includes an adjustment mechanism (not shown) for locking the belt tightening roller at a position to provide the desired tension on the belts.

Figure 2:
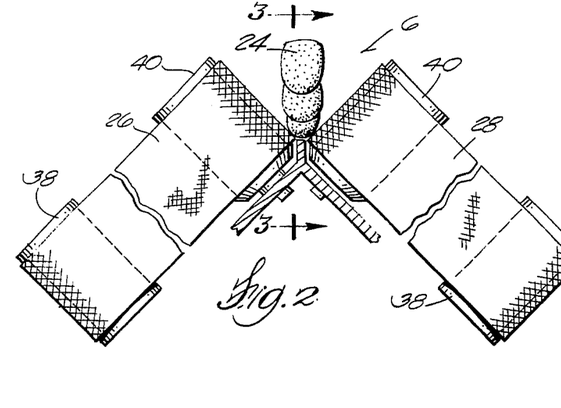
FIG. 2 is an enlarged, fragmentary end view of the inlet end of the apparatus illustrated in FIG. 1.

Each of the belt biasing rollers 34, 36 and 38 are mounted on a stationary axis which is located on the opposite sides of the longitudinal center line of the apparatus and spaced therefrom so that, as the individual belts 26 and 28 advance towards the inlet end 16, they are separated progressively further apart from each other. Further, the axes of the belt biasing rollers 36 and 38 on the idler rollers 40 are arranged at an angle to the horizontal so that the belts 26 and 28 are gradually twisted and assume angularly related positions whereby they cooperate to form, at the inlet end 16, a generally V-shaped trough having an included angle of approximately 90° as shown in FIGS. 1 and 2. The support rollers 42 are mounted on stationary axes located on opposite sides of the longitudinal center line of the apparatus and maintain the belts 26 and 28 in the same general V-shape throughout the feed station 18.

Figures 6, 7, 11, 12, 14, 15:
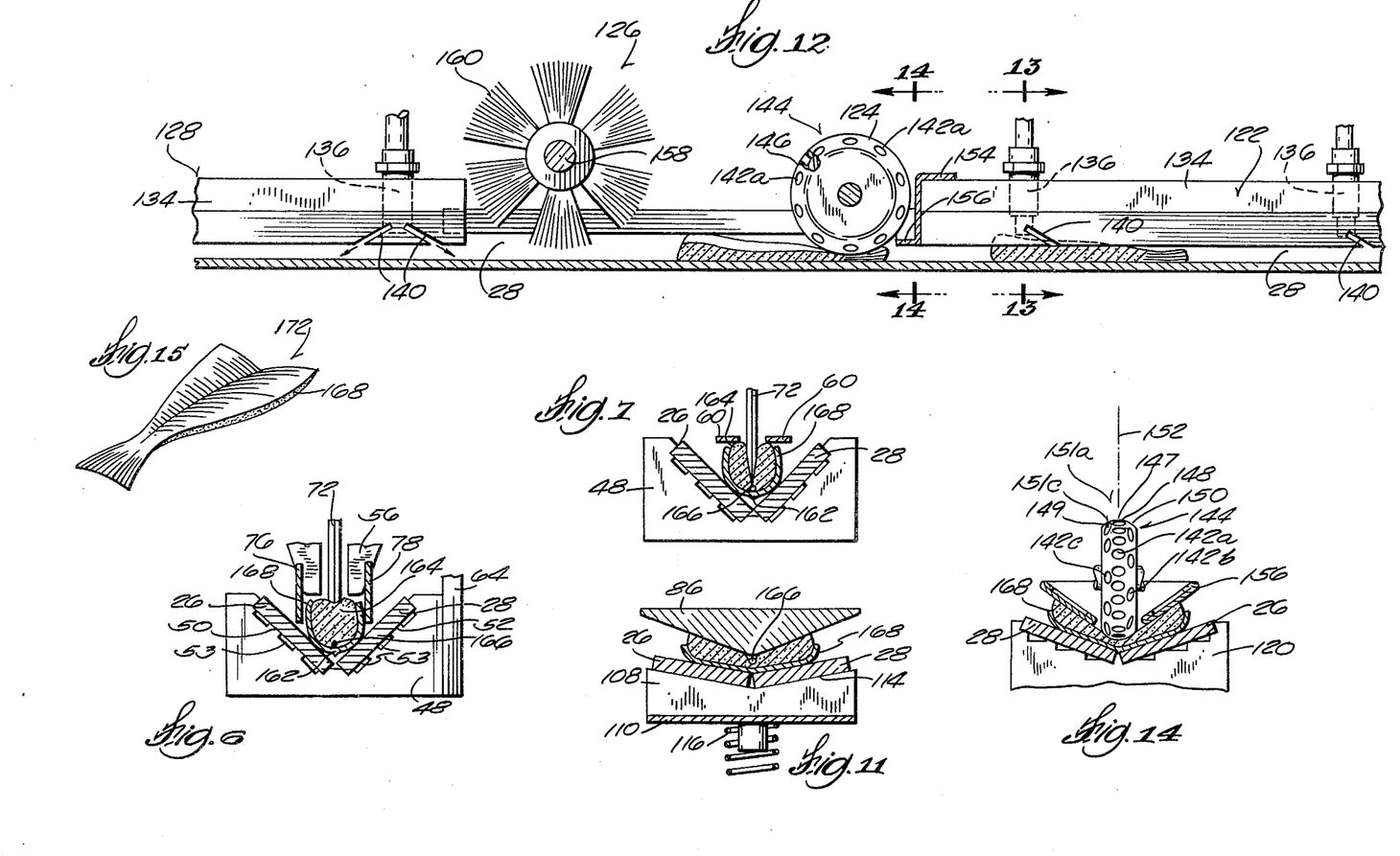
FIGS. 6 and 7 are sectional views taken along the lines 6—6 and 7—7 in FIG. 4, respectively.
FIGS. 10 and 11 are sectional views taken along the lines 10—10 and 11—11 in FIG. 8, respectively.
FIG. 12 is a fragmentary, side elevation view, partially broken away and partially sectioned, of the cleaning station.
FIGS. 13 and 14 are sectional views taken along the lines 13—13 and 14—14 in FIG. 12, respectively.
FIG. 15 is a perspective view of the shrimp after it has been processed by the apparatus of the invention.
Figure 6:
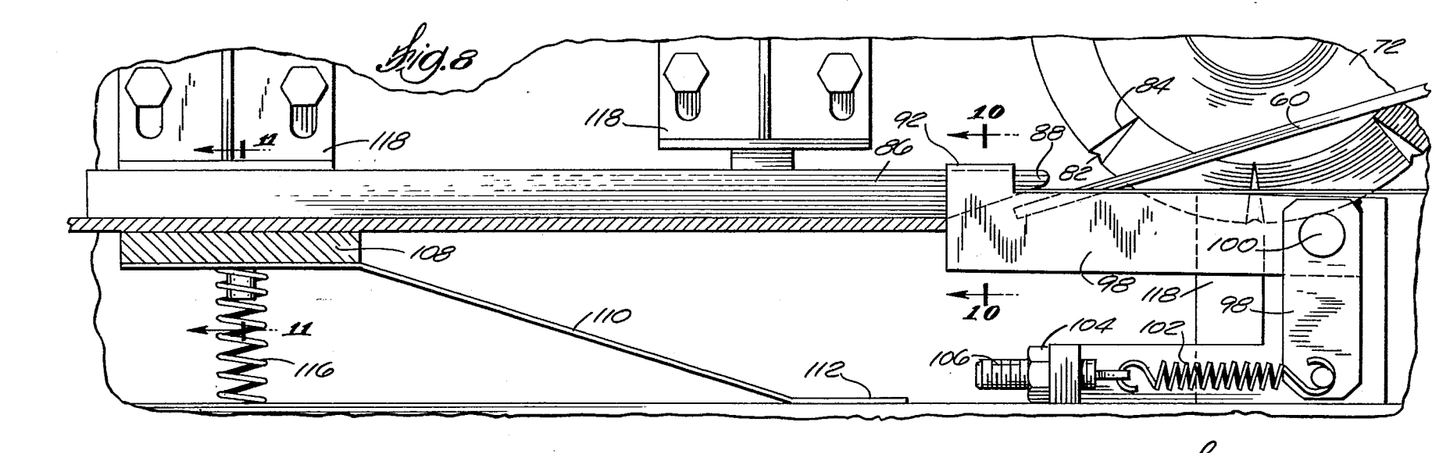

The uncurling station 19 includes an elongated, belt guide member 48 having a pair of angularly related, longitudinally extending belt guideways 50 and 52 in which the respective belts 26 and 28 are slidably guided to form a V-shaped trough (FIG. 6). As in the feed station, the included angle between the belts in the uncurling station can be about 90°. Each of the guideways 50 and 52 preferably is provided with a plurality of laterally spaced, longitudinally extending grooves 53 so as to minimize the friction between the respective belt and guideway.

Figure 4:
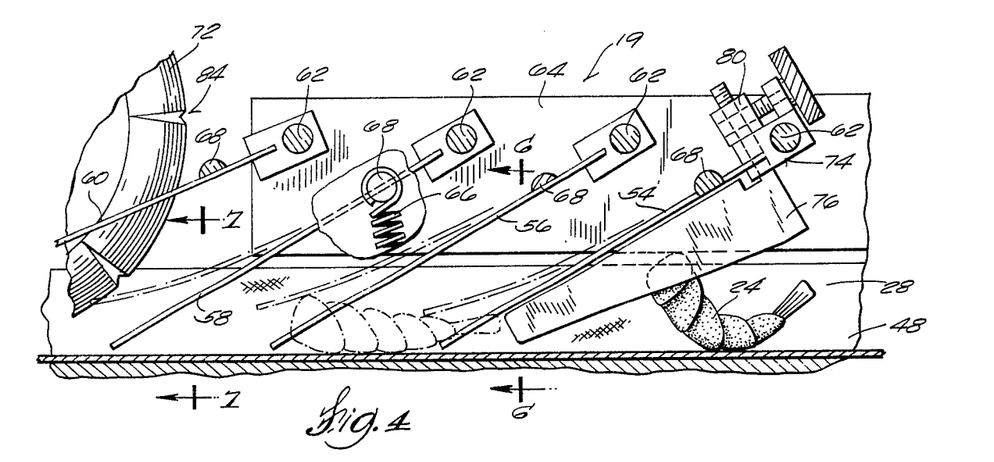
FIG. 4 is an enlarged, fragmentary side view, partially broken away, of the uncurling station.

Mounted for swingable movement away from and toward the belts 26 and 28 are a plurality of longitudinally spaced, hold down leaf members 54, 56, 58 and 60 which successively engage the underside or belly portion of the shrimp 24 as it is moved through the uncurling station 19 by the belts 26 and 28, as best shown in FIG. 4. Each leaf member 54, 56, 58 and 60 is pivotally mounted on a horizontally extending shaft 62 located above the belts 26 and 28 and connected at one end to a plate 64 extending vertically from one side of the guide block member 48. Each leaf member extends at an acute angle with respect to the direction of the shrimp travel and is biased towards the belts 26 and 28 by a tension spring 66 having one end connected to a horizontal member 68 mounted on the leaf member and the other end connected to the guide block member 48 on the side opposite to the plate 64.

Figure 5:
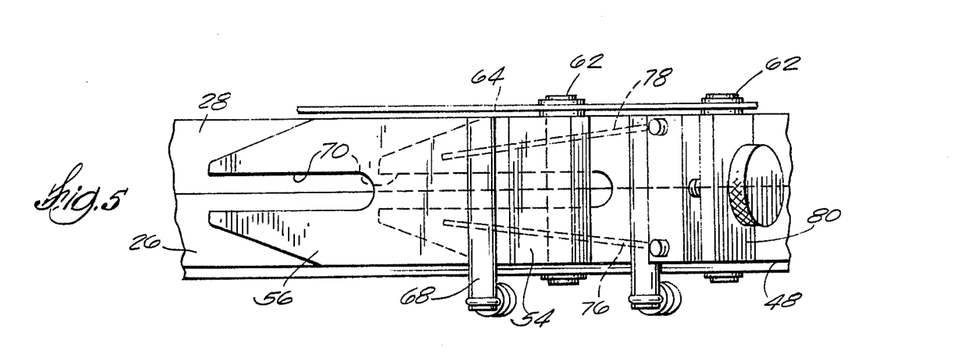
FIG. 5 is a partial top plan view of the uncurling station illustrated in FIG. 4.

As shown in FIGS. 4 and 5, the lower free end of each leaf member is tapered to permit movement thereof down into the V-shaped trough formed by the belts 26 and 28 to a normal position where it is located in a relatively closely spaced relationship to the belts. The biasing force provided by the spring 66 causes the leaf members to press the shrimp 24 into snug engagement with the apex portion of the V-shaped trough formed by the belt. Adjacent pairs of the spring members engage the underside or belly portion of an individual shrimp 24 at longitudinally spaced locations and cooperate with the belts 26 and 28 to provide the desired uncurling function illustrated in FIG. 4. To minimize the area of contact between the leaf members and the shrimp, and thus minimize the drag on the shrimp, each leaf member is provided with a centrally located, elongated slot 70. The slots 70 in the last two leaf members 58 and 60 also accommodate a cutter blade 72 to be described below.

A guide assembly 74 preferably is provided at the inlet or entry end of the uncurling station 19 for centering the shrimp within the V-shaped trough formed by the belts 26 and 28. The guide assembly includes a pair of guide members 76 and 78 which converge in the direction of the shrimp travel and cooperate with the belts to guide the shrimp into the desired centered position as illustrated in FIGS. 5 and 6. The guide assembly 74 can be provided with a suitable adjustment mechanism, generally designated at 80, which is arranged to adjust the lateral clearance between the outer free ends of the guide members 76 and 78 so that different size shrimp can be accommodated.

The cutting station 20 includes a rotatably mounted cutter blade 72 which is located above the travel path of the shrimp and is driven by a suitable prime mover (not shown), such as an electric motor, in a direction so that the cutting edge of the blade, in the area of contact with the shrimp, moves substantially in the same direction as the direction of the shrimp travel, i.e., rotates clockwise as viewed in FIGS. 1 and 8. While the cutter blade 72 can be of various suitable constructions, it preferably is constructed in the manner described in above-identified U.S. Pat. No. 3,867,740 which patent is incorporated herein by reference. That is, a plurality of notches 82 and radially extending grooves 84, like 76 and 78 illustrated in FIG. 10 of the above-identified patent, are provided on the periphery of the cutting edge of the cutter blade 72.

Figures 9, 10, 13:
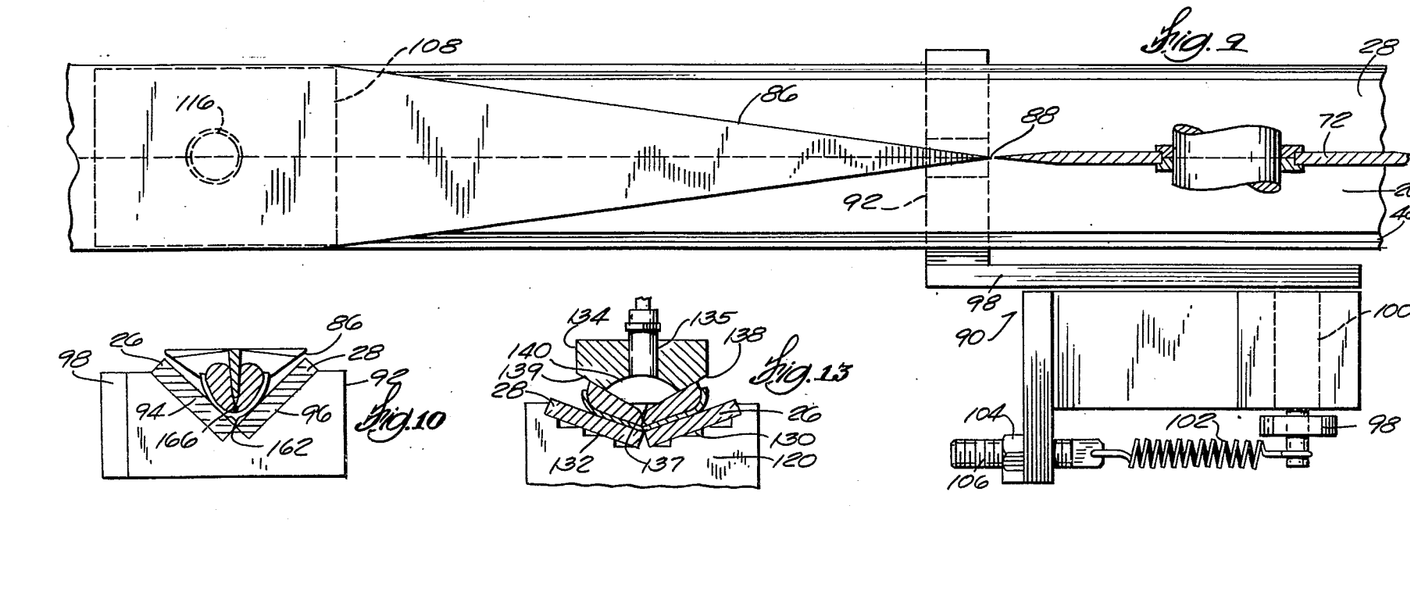
FIG. 9 is a partial top plan view of the cutting and spreader stations illustrated in FIG. 8.

The next station is the spreader station 21 which includes a stationary spreader element 86 mounted on the longitudinal center line of the apparatus and spaced above the apex of the V-shaped trough formed by the belts 26 and 28. The spreader element 86 preferably is arranged in the same general manner as the spreader element 98 described and illustrated in U.S. Pat. No. 3,867,740. More specifically, the leading or forward end 88 of the spreader element 86 is relatively sharp pointed and the opposite edges diverge therefrom in the direction of the shrimp travel as shown in FIG. 9. Further, the spreader element 86 has a cross sectional shape resembling a deep V-boat hull, i.e., successive cross sections taken from the forward end toward the rear end have a sharp V-shape at the forward end and have progressively broader V-shapes as you move toward the rear end.

As best shown in FIGS. 8 and 10, the belts 26 and 28 are supported in the vicinity of the forward end 88 of the spreader element 86 by a belt biasing mechanism 90 including a belt pressure block 92 having a pair of angularly related belt guideways 94 and 96 for slidably receiving the belts 26 and 28, a generally L-shaped bracket 98 carrying the pressure block 92 and mounted for swingable movement at 100, and a tension spring 102 connected at one end to the bracket 98 for biasing the pressure block 92 into engagement with the underside of the belts. The biasing pressure imposed on the belts by the pressure block 92 can be adjusted by loosening or tightening a nut 104 threaded onto a stud 106 to which the other end of the spring 102 is connected. The guideways 94 and 96 of the pressure block 92 preferably are arranged so that the included angle between the belts 26 and 28 at this point is substantially the same as in the guide member 48 at the uncurling station 19.

As best shown in FIGS. 8 and 11, the belts 26 and 28 are supported in the vicinity of the rear end of the spreader element 86 by a pressure pad 108 which is mounted on the free end of a resilient member 110, the opposite end thereof being fixably attached at 112. The upper surface of the pressure pad 108 is provided with a V-shaped recess 114 for slidably receiving the belts and is biased into engagement with the underside by the belts by a compression spring 116. The recess 114 preferably is arranged so that the included angle between the belts 26 and 28 at this point is somewhat larger than at the pressure block 92 and the guide member 48. For example, when this included angle is about 90° at the pressure block and the guide member, it can be about 160° at the pressure pad. The resultant broadening of the Vee formed by the belts between the pressure block 92 and the pressure pad 108 enhances the flattening or spreading of the shrimp by the spreader element 86 as explained hereinafter. The spreader element 86 preferably is adjustably mounted, such as on support brackets 118 (FIGS. 1 and 8), so it can be raised or lowered relative to the belts to accommodate different size shrimp.

The final station is the cleaning station 22 wherein the principal components are an elongated, belt guide member 120, a first stage spray assembly 122, a cleaning disc or wheel 124, a cleaning brush 126 and a second stage spray assembly 128. The guide member 120, similar to the guide member 48 at the uncurling station, has a pair of angularly related belt guideways 130 and 132 (FIG. 13). The guideways 130 and 132 preferably are arranged so that the included angle between the belts 26 and 28, while moving through the cleaning station, is somewhat larger, e.g., 140°, than while moving through the feed station, the uncurling station, and the cutting station.

The first and second stage spray assemblies 122 and 128 are arranged in a similar manner and each includes an elongated block member 134 having a plurality of cavities 135 for admitting a cleaning fluid from a common supply 136 (fragmentarily illustrated in FIG. 1). As best shown in FIG. 13 the bottom of each block member 134 has a flat central portion 137 and angled edge portions 138 and 139 generally corresponding to the shape of the belts 26 and 28 passing thereunder. Also, the bottom of the block member 34 is provided with at least one spray jet 140 communicating with each cavity 135 (See FIGS. 12 and 13).

In the preferred embodiment illustrated, the first stage spray assembly 122 is provided with a single spray jet 140 for each cavity 135 which is angled approximately 30° with respect to the horizontal to direct a pressurized flow of the cleaning fluid onto the upper, exposed surface of the shrimp at an angle opposed to the direction of the shrimp travel. The second stage spray assembly is provided with a pair of oppositely angled jets 140 for each cavity, one directing the cleaning fluid onto the shrimp at an angle opposed to the direction of travel and the other directing the cleaning fluid onto the shrimp at an angle in the same direction as the direction of travel. To obtain maximum coverage of the cleaning fluid across the exposed surface of the shrimp, the spray jets 140 preferably are arranged to provide a fan type spray. This can be accomplished by simply making a cut through the bottom of the block member 134 to the cavity 135 with a relatively thin, circular saw.

The cleaning wheel 124 is rotatably mounted near the rear end of the first spray assembly 122 and is driven by a suitable prime mover (not shown), such as an electric motor, in a direction so that the outer periphery thereof, in the area of contact with the shrimp, moves in substantially the same direction as the direction of the shrimp travel, i.e., rotates clockwise as viewed in FIGS. 1 and 12. As best shown in FIGS. 12 and 13, a plurality of circumferentially spaced cavities 142a, 142b and 142c are provided in the outer peripheral surface 144 of the cleaning wheel. The cleaning wheel 124 is fabricated from a relatively hard material, such as stainless steel, and the cavities 142a, 142b and 142c are formed therein, such as by drilling. When the cleaning wheel is used for processing shrimp, as in the construction illustrated, the cavities preferably are formed in a manner to provide a relatively sharp edge 146 at the juncture of the cavity wall 147 and the outer peripheral surface 144 (FIG. 12). The function of these cavities will be explained hereinafter.

In the preferred embodiment illustrated, the outer peripheral surface 144 of the cleaning wheel 124 is generally convex with respect to the rotational axis of the cleaning wheel and includes a radially outermost central portion 148 and opposed arcuate side portions 149 and 150. The cavities 142a, 142b and 142c are arranged in three separate rows 151a, 151b and 151c. The centers of the cavities 142a in the center row 151a are located substantially on the peripheral center of the cleaning wheel (designated by reference 152 in FIG. 13) and are circumferentially spaced with respect to each other at substantially equal intervals. The rows 151b and 151c of cavities 142b and 142c are located on the opposite sides of the center line 152 with the cavities 142b and 142c located in staggered relationship with respect to each other and with respect to the cavities 142a. The cavities 142b and 142c preferably are circumferentially spaced within their respective rows at equal intervals. The centers of the cavities 142b and 142c preferably are generally perpendicular to a line tangent to the respective arcuate side portions 149 and 150. If desired, only a single center row 151a of the cavities (either circumferentially aligned or in staggered relationship) or only the two side rows 151b and 151c of the cavities can be used. While the cavities 142a, 142b and 142c are illustrated as having a generally circular cross section, it should be understood that they have other suitable shapes, such as triangular, elliptical, hexagonal, etc.

Mounted on the rear end of the block member 134 of the first stage spray assembly 122 is a hold down member 154 including a generally V-shaped lower portion 156 which serves to hold the shrimp snugly against the belts 26 and 28 after exiting from the first stage spray assembly 122 and during contact by the cleaning wheel 124 as best shown in FIG. 13.

The cleaning brush 126 is rotatably mounted at a location longitudinally spaced from the cleaning wheel 124. While the cleaning brush can be of any suitable construction, in the preferred construction illustrated, it includes a hub 158 and a plurality of plastic bristles 160 extending radially outwardly from the hub 158. The cleaning brush is driven by a suitable primer mover (not shown), such as an electric motor, in a direction so that the bristles 160, in the area of contact with the shrimp, move in substantially the same direction as the direction of the shrimp travel, i.e., rotates in a clockwise direction as viewed in FIGS. 1 and 12.

OPERATION

De-headed and unshelled shrimp 24 are introduced back or shell side down, and preferably head first, into the feed station 18, such as by manually inserting the individual shrimps into the V-shaped trough formed by the belts 26 and 28. If desired, suitable auxiliary feed apparatus (not shown) can be used to perform this function. The shrimp, when introduced into the feed station 18, are generally in a curled-up shape such as shown in FIG. 3. After each shrimp is picked up by the moving belts 26 and 28 in the feed station, it is moved continuously through the machine without any further attention or manipulation by the operator. In other words, after introduction into the feed station, the entire processing of the shrimp by the apparatus is completely automatic.

As the shrimp 24 is advanced through the apparatus by the belts 26 and 28 and enters the uncurling station 19, it is first guided to a centered position between the belts by the guide members 76 and 78 (FIGS. 4 and 6). The small spine portion 162 of the shrimp is accommodated in the apex portion of the V-shaped trough formed by the belts.

As the shrimp is moved through the uncurling station 19, the upper surface of the body portion 164 is successively engaged by the leaf members 54, 56, 58 and 60. The leaf members are positioned so that an adjacent pair thereof simultaneously engage an individual shrimp at longitudinally spaced locations and the biasing action provided by the spring 66 tend to press the shrimp snugly against the belts, thereby uncurling it and holding it in a substantially horizontally extended position as best shown in FIG. 4.

At the cutting station 20, the body portion 164 is cut as shown in FIG. 7. The cutting edge of the cutter blade 72 is positioned relative to the belts 26 and 28 so that the blade cuts through the belly down into the body portion of the shrimp only to the point at which the sand vein or alimentary canal 166 is located, but does not cut through the shell 168 of the shrimp. The sharp edges of the notches 82 in the cutter blade 72 serve to loosen and at least partially tear out the vein 166 as the shrimp passes beneath the blade. The edges of the grooves 84 in the side faces of the cutter blade serve to engage the body 164 of the shrimp and tend to assist movement of the shrimp through the cutting station. As best shown in FIGS. 1 and 4, the free ends of the last two leaf members 58 and 60 extend beyond the forward portion of the cutter blade and the cutter blade is received within the slots 70 provided therein. Thus, these leaf members serve to hold the shrimp in an uncurled or horizontally extended position as it is moved beneath the cutter blade.

The shrimp is moved from the cutting station 20 into the flattening or spreader station 21 where it is moved beneath the stationary spreader element 86. The pointed front end 88 of the spreader element 86 enters the cut made in the shrimp by the cutter blade and, during continued movement of the shrimp beneath the spreader element, the shrimp is flattened or spread from a position such as that shown in FIG. 10 to a flattened or so-called butterfly position such as that shown in FIG. 11 where the vein 166 is exposed. The cut and flattened shrimp then passes from the spreader station 21 to the cleaning station 22.

The first and second stage spray assemblies 122 and 128 operate in substantially the same manner, except that the second stage spray assembly directs the cleaning fluid in opposite directions onto the shrimp as described above. Therefore, the operation of only the first stage spray assembly will be described in detail. The cleaning fluid used in the spray assembly can be a liquid, such as water, an inert gas, such as air, or a combination of such a liquid and gas. The cleaning liquid is introduced under pressure into the cavities 135 of the block member 134 and is forced through the jets 140 to impinge onto the exposed and flattened body of the shrimp. This impingement action tends to purge or flush away loose debris and portions of the vein loosened or partially loosened by the cutter blade. The jets 140, by injecting the cleaning fluid onto the shrimp in a direction opposite to its direction of travel, enhances this purging or flushing action. The flat central portion 137 and the angled edge portions 138 and 139, together with the flattened body of the shrimp, provide a passage through which the cleaning fluid can flow.

The flattened, initially cleaned shrimp is then moved from the first stage spray assembly 122 into contact with the cleaning wheel 124 which in the preferred embodiment is rotated at about 1725 r.p.m. As the cleaning wheel is rotated relative to the shrimp, the outer peripheral surface 144 engages a central portion of the flattened body of the shrimp under a slight compression. Any remaining portions of the vein 166 and other extraneous material, such as roe, tend to be compressed into the cavities 142a, 142b and 142c such that, as the cleaning wheel rotates relative to the shrimp, a gentle rubbing and pulling action provided by the edges 146 of the cavities tends to sever or loosen these materials without causing any substantial damage to the meat or flesh.

The cleaning action provided by the cleaning wheel 124 can be enhanced by directing a flow of a cleaning liquid, such as water, onto the outer periphery of the cleaning wheel 124. The cleaning liquid is picked up in the cavities, as well as on the outer peripheral surface of the cleaning wheel, and is available for rinsing away any debris loosened by the cleaning wheel. In the preferred embodiment illustrated, this is accomplished by providing a spray nozzle 170 which is connected to the water supply 137 and is located to direct a water spray onto the cleaning wheel as shown in FIG. 1.

After being moved past the cleaning wheel, the flattened shrimp is then moved beneath the rotating cleaning brush 126. The bristles 160 of the brush contact the shrimp and provide a brushing action for removing remaining portions of the vein, roe and other debris.

The flattened shrimp is thereafter moved beneath the second stage cleaning assembly 128 for a final cleaning operation whereby any remaining loose debris is purged or flushed away by the impinging action of the cleaning fluid directed thereon by the jets 140. The processed shrimp 172 then passes from the second stage spray assembly 128 to the outlet end 17 of the apparatus. The shrimp are then packaged in any suitable manner.

The processed shrimp 172 has a butterfly shape like that shown in FIG. 15. The processed shrimp can be boiled or cooked in some suitable manner and the flesh or meat of the shrimp removed from the shell after cooking by simply gripping the flesh with a fork and pulling it away from the shell. In the preferred embodiment, the belts 26 and 28 are driven at a speed of approximately 40–50 feet per minute which means that, by positioning shrimp on the belts at about 4 inches intervals in the feed station, 18, it is possible to process in the neighborhood of 120–150 shrimp per minute.

From the foregoing description of a preferred embodiment of the invention, one skilled in the art can easily ascertain the essential features of the invention, and without departing from the spirit and scope thereof, make various changes and modifications of the invention to adapt it to various uses.

When used for enviscertaing fish, the apparatus preferably is arranged so that the fish is conveyed belly side down through the cutting, spreading and cleaning stations and the cutter blade, the spreader element, the cleaning wheel, the rotating brush and the spray assemblies are located below the fish. To accomplish this mode of operation, the conveyor means can comprise a pair of laterally spaced belts similar to belts 24 described in the above-identified U.S. Pat. No. 3,867,740.

It is not necessary to provide an uncurling station and the conveyor belts can be arranged to center the fish over and hold it downwardly against the cutter blade, the spreader element and the cleaning wheel. The cutter blade is located to slit or cut open the fish belly to open the belly cavity and expose the viscera. The spreader element, rather than being arranged to cause the side portions of the fish to be substantially flattened as described above, is arranged to spread open the side portions far enough to permit the cleaning wheel to enter the belly cavity and pull away the viscera. Since the fish is belly side down, the viscera tends to fall downwardly after the belly is opened, thereby facilitating removal by the cleaning wheel.

When used for cleaning fish, the edges of the cleaning wheel cavities preferably are rounded so as to minimize tearing of the flesh. Also, the cleaning wheel and the rotary brush can be rotated in a direction opposite to the direction of fish travel, i.e., rotated counterclockwise as viewed in FIG. 1.

We claim:
1. Apparatus for processing de-headed and unshelled shrimp and the like comprising:
   a cutting station including a cutter means for cutting through the belly of the shrimp to the alimentary canal of the shrimp;
   a spreader station including spreader means for spreading the portions of the shrimp on the opposite sides of the cut formed therein by said cutter means and thereby causing the shrimp to assume a substantially flattened position with the shell remaining attached and the alimentary canal exposed;
   a cleaning station including a rotating cleaning wheel means having an outer peripheral surface for engaging the central portion of the flattened shrimp in the vicinity of the alimentary canal, said peripheral surface including a plurality of circumferentially spaced cavities, each having an edge portion adjoining said peripheral surface, whereby portions of the alimentary canal and/or similar debris can be compressed into said cavities and be pulled away from the shrimp by said cavity edge portions as said cleaning wheel rotates relative to the shrimp; and
   conveyor means for moving the shrimp successively through said cutting, spreader and cleaning stations.

2. Shrimp processing apparatus according to claim 1 wherein said peripheral surface of said cleaning wheel means has a generally convex, cross sectional shape with respect to the rotational axis of said cleaning wheel means and includes a radially outermost central portion and opposed arcuate side portions.

3. Shrimp processing apparatus according to claim 2 wherein said cleaning wheel means includes a row of said cavities located in said central portion of said peripheral surface.

4. Shrimp processing apparatus according to claim 2 wherein said cleaning wheel means includes a row of said cavities located in at least one of said side portions of said peripheral surface.

5. Shrimp processing apparatus according to claim 2 wherein said cleaning wheel means includes:
   a first row of said cavities located in said central portion of said peripheral surface with the centers thereof located substantially on the peripheral center line of said cleaning wheel means,
   a second row of said cavities located in one of said side portions of said peripheral surface, and
   a third row of said cavities located in the other of said side portions of said peripheral surface.

6. Shrimp processing apparatus according to claim 5 wherein said cavities have a circular cross section.

7. Shrimp processing apparatus according to claim 6 wherein said cavities in each of said rows are circumferentially spaced at equal intervals with respect to each other and are located in staggered relationship to said cavities in both of the other of said rows.

8. Apparatus for processing de-headed and unshelled shrimp and the like comprising:
   an uncurling station including uncurling means for engaging the underside of normally curled shrimp moving therethrough and causing the shrimp to assume a substantially horizontally extended position;
   a cutting station including a cutter means for cutting through the belly of the shrimp to the alimentary canal of the shrimp;
   a spreader station including a spreader means for spreading the portions of the shrimp on the opposite sides of the cut formed therein by said cutter means and thereby causing the shrimp to assume a substantially flattened position with the shell remaining attached and the alimentary canal exposed;
   a cleaning station including a rotating cleaning wheel means having an outer peripheral surface for engaging the central portion of the flattened shrimp in the vicinity of the alimentary canal, said peripheral surface including a plurality of circumferentially spaced cavities, each having an edge portion adjoining said peripheral surface, whereby portions of the alimentary canal and/or similar debris can be compressed into said cavities and be pulled away from the shrimp by said cavity edge portions as said cleaning wheel means rotates relative to the shrimp; and
   conveying means for moving the shrimp successively through said uncurling, cutting, spreader and cleaning stations.

9. Shrimp processing apparatus according to claim 8 wherein said uncurling means includes a plurality of longitudinally spaced leaf members, each having a free end adapted to resiliently engage the underside of the shrimp as it passes thereby with an adjacent pair of said leaf members being positioned so that said free ends simultaneously engage an individual shrimp at longitudinally spaced locations to thereby uncurl the shrimp.

10. Shrimp processing apparatus according to claim 9 wherein said uncurling station includes, at the entry end thereof, guide means for centering the shrimp on said conveyor means prior to engagement by said leaf members.

11. Shrimp processing apparatus according to claim 9 wherein said cutter means comprises a rotating cutter blade mounted above the travel path of the shrimp as it is moved through said cutter station by said conveying means, at least one adjacent pair of said leaf members are arranged to maintain an individual shrimp in a substantially horizontally extending position as it enters said cutting station.

12. Shrimp processing apparatus according to claim 8 wherein said cleaning station further includes cleaning fluid means for directing a flow of cleaning fluid under pressure onto the exposed surface of the flattened shrimp after it passes through said spreader station.

13. Shrimp processing apparatus according to claim 8 wherein said cleaning station further includes a rotating brush having bristles adapted to contact the exposed surface of the flattened shrimp after it passes said cleaning wheel means.

14. Shrimp cleaning apparatus according to claim 13 wherein said cleaning station includes a pair of said cleaning fluid means, a first one of which is located between said spreader station and said cleaning wheel means and a second one of which is located between said cleaning wheel means and the outlet end of said cleaning station, and wherein said rotating brush is located between said cleaning wheel and said second cleaning fluid means.

15. Shrimp processing apparatus according to claim 8 wherein said conveyor means includes a pair of endless conveyor belts mounted on the opposite sides of the longitudinal center line of said apparatus and supported on belt guide means which retain said conveyor belts in an angular relationship whereby said conveyor belts cooperate to form a generally V-shaped trough through said uncurling, cutting and cleaning stations.

16. Shrimp processing apparatus according to claim 8 wherein said spreader means includes a stationary spreader element having a front end, a rear end and a V-shaped cross section which progressively broadens in a direction from said front ends towards said rear end.

17. Shrimp processing apparatus according to claim 8 wherein said uncurling station includes a first guide member having a first pair of angularly related, longitudinally extending belt guideways for slidably receiving a respective one of said conveyor belts, and wherein said cleaning station includes a second guide member having a second pair of angularly related, longitudinally extending belt guideways for slidably receiving a respective one of said conveyor belts, said first and second pairs of belt guideways being arranged so that the included angle between said conveyor belts is smaller while moving through said uncurling sections than while moving through said spreader and cleaning stations.

18. Shrimp processing apparatus according to claim 17 wherein said spreader station includes:

a third belt guide member having a V-shaped pressure member located in the vicinity of said spreader element front end for slidably receiving said conveyor belts, means for biasing said pressure member into contact with said conveyor belts, a fourth belt guide member having a V-shaped pressure pad located in the vicinity of said spreader element rear end for slidably receiving said conveyor belts, and means for biasing said pressure pad into contact with said conveyor belts.

19. Apparatus for processing de-headed and unshelled shrimp and the like comprising:

a feed station for receiving the shrimp in a back down position;

an uncurling station including means for engaging the underside of normally curled shrimp moving therethrough and causing the shrimp to assume a substantially horizontally extended position;

a cutting station including a rotating cutter blade mounted above the travel path of the shrimp moving through said cutter station and adapted to cut through the belly of the shrimp to the alimentary canal of the shrimp;

a spreader station incuding a spreader means for spreading the portions of the shrimp on the opposite sides of the cut formed therein by said cutter blade and thereby causing the shrimp to assume a substantially flattened position with the shell remaining attached and the alimentary canal exposed;

a cleaning station including a rotating cleaning wheel means having an outer peripheral surface for engaging the central portion of the flattened shrimp in the vicinity of the alimentary canal, said peripheral surface including a plurality of circumferentially spaced cavities, each forming a relatively sharp edge at the juncture with said peripheral surface, whereby portions of the alimentary canal and/or similar debris can be compressed into said cavities and pulled away from the shrimp by said cavity edge portions as said cleaning wheel means rotates relative to the shrimp; and a conveying means for moving the shrimp from said feed station and successively through said uncurling, cutting, spreader and cleaning stations, said conveying means including a pair of endless conveyor belts mounted on the opposite sides of the longitudinally center line of said apparatus and supported on belt guide means which retain said conveyor belts in angular relationship whereby said conveyor belts cooperate to form a generally V-shaped trough throughout said feed, uncurling, cutting, spreader and cleaning stations.

20. Shrimp processing apparatus according to claim 19 wherein said peripheral surface of said cleaning wheel means has a generally convex, cross sectional shape with respect to the rotational axis of said cleaning wheel and includes a radially outermost central portion and opposed arcuate side portions.

21. Shrimp processing apparatus according to claim 20 wherein said cleaning wheel means includes a row of said cavities located in said central portion of said peripheral surface.

22. Shrimp processing apparatus according to claim 20 wherein said cleaning wheel means includes a row of said cavities located in at least one of said side portions of said peripheral surface.

23. Shrimp processing apparatus according to claim 20 wherein cleaning wheel means includes:
   a row of said cavities located in said central portion of said peripheral surface with the centers thereof located substantially on the peripheral center line of said cleaning wheel means,
   a second row of said cavities located in one of said side portions of said peripheral surface, and
   a third row of said cavities located in the other of said side portions of said peripheral surface.

24. Shrimp processing apparatus according to claim 23 wherein said cavities have a circular cross section.

25. Shrimp processing apparatus according to claim 23 wherein said cleaning station further includes cleaning means for directing a flow of cleaning fluid under pressure onto the exposed surface of the flattened shrimp after it passes through said spreader station.

26. Shrimp processing apparatus according to claim 25 wherein said uncurling means includes a plurality of longitudinally spaced leaf members, each having a free end adapted to resiliently engage the underside of the shrimp as its passes thereby, with an adjacent pair of said leaf members being positioned so that said free ends simultaneously engage an individual shrimp at longitudinally spaced location to thereby curl these shrimp, at least one adjacent pair of said leaf members being arranged to maintain the shrimp in a substantially horizontally extended position as it enters said cutting station, and wherein said uncurling station includes, at the entry end thereof, guide means for centering the shrimp between said conveyor belts prior to engagement by said leaf members.

27. Shrimp processing apparatus according to claim 26 wherein said spreader means includes a stationary spreader element having a front end, a rear end and a V-shaped cross section which progressively broadens in a direction from said front end towards said rear end.

28. Shrimp processing apparatus according to claim 27 wherein said cleaning station includes:
   a rotating brush having bristles adapted to contact the exposed surface of th flattened shrimp after it passes said cleaning wheel means, and
   a pair of said cleaning fluid means, a first one of which is located between said spreader station and said cleaning wheel means and a second of which is located between said rotating brush and the outlet end of said cleaning station.

29. Shrimp processing apparatus according to claim 28 wherein said first and second cleaning means include a plurality of jets which are disposed at an angle with the horizontal to direct a flow of the cleaning fluid in a direction opposite to the travel direction of the shrimp.

30. Shrimp processing apparatus according to claim 29 wherein said second cleaning means further includes a plurality of said jets which are disposed at an angle to the horizontal to direct a flow of cleaning fluid onto the exposed surface of the shrimp in the same direction as the travel direction of the shrimp.

31. A method for processing de-headed and unshelled shrimp and the like comprising the steps of:
   a. cutting into the belly of the shrimp to a point at which the alimentary canal of the shrimp is located;
   b. spreading the portions of the shrimp on the opposite sides of the cut to cause the shrimp to assume a substantially flattened position with the alimentary canal exposed;
   c. contacting the central portion of the thus-flattened shrimp in the vicinity of the exposed alimentary canal with the outer peripheral surface of a rotating cleaning wheel means having a plurality of circumferentially spaced cavities, each forming an edge portion at the juncture with the peripheral surface of the cleaning wheel means, whereby portions of the alimentary canal and/or similar debris can be compressed into the cavities and pulled away from the shrimp by the cavity edge portions during rotation of the cleaning wheel means relative to the shrimp.

32. A method for processing de-headed and unshelled shrimp and the like comprising the steps of:
   a. uncurling individual shrimp to a substantially horizontally extending position;
   b. cutting into the belly of the shrimp when in said horizontally extended position to the point at which the alimentary canal of the shrimp is located;
   c. spreading the portions of the shrimp on the opposite sides of the cut to cause the shrimp to assume a substantially flattened position with the alimentary canal exposed; and
   d. contacting the central portion of the thus-flattened shrimp in the vicinity of the exposed alimentary canal with the outer peripheral surface of the rotating cleaning wheel means having a plurality of circumferentially spaced cavities, each forming an edge portion at the juncture with the peripheral surface of the cleaning wheel means, whereby portions of the alimentary canal and/or similar debris can be compressed into the cavities and pulled away from the shrimp by the cavity edge portions during rotation of the cleaning wheel means relative to the shrimp.

33. A method according to claim 32 wherein said uncurling step (a) is performed by moving the shrimp beneath a plurality of leaf members which resiliently engage the underside of the shrimp, adjacent pair of the leaf members being located so that the lower free ends engage an individual shrimp at longitudinally spaced locations to uncurl the shrimp.

34. A method according to claim 33 wherein said spreading step (c) is performed by passing the cut shrimp beneath a stationary spreader element adapted to enter the cut formed therein during said cutting step (b) and having a V-shaped cross section which progressively broadens in the direction of travel of the shrimp.

35. A method according to claim 34 including the further step of directing a flow of cleaning fluid onto the exposed surface of the flattened shrimp after said spreading step (c).

36. Apparatus for cleaning shrimp, fish and the like comprising:
   a cutting station including a cutter means for forming a cut in the belly portion of the shrimp;
   a spreader station including spreader means for spreading apart the portions of the shrimp on the opposite sides of the cut formed therein by the cutter means and forming an opening therebetween;
   a cleaning station including a rotating wheel means adapted to enter the opening and remove the viscera from the shrimp, said cleaning wheel means having an outer peripheral surface including a plurality of circumferentially spaced cavities, each having an edge portion adjoining said peripheral surface, whereby portions of the viscera can be compressed into said cavities and pulled away from the shrimp by said cavity edge portions as said cleaning wheel means rotates relative to the shrimp.

37. Apparatus according to claim 36 wherein said peripheral surface of said cleaning wheel means has a generally convex, cross sectional shape with respect to the rotational axis of said cleaning wheel means and includes a radially outermost central portion and opposed arcuate side portions.

38. Apparatus according to claim 37 wherein sid cleaning wheel means includes a row of said cavities located in said central portion of said peripheral surface.

39. Apparatus according to claim 37 wherein said cleaning wheel means includes a row of said cavities located in at least one of said side portions of said peripheral surface.

40. Apparatus according to claim 37 wherein said cleaning wheel means includes:
a first row of said cavities located in said central portion of said peripheral surface with the centers thereof located substantially on the peripheral center line of said cleaning wheel means,
a second row of said cavities located in one of said side portions of said peripheral surface, and
a third row of said cavities located in the other of said side portions of said peripheral surface.

41. Apparatus for enviscerating shrimp, fish or the like, the belly portion of which has been cut and opened to expose the viscera thereof, comprising:
a rotating cleaning wheel means adapted to enter the opening in the shrimp and remove the viscera thereform, said cleaning wheel means adapted to engage the exposed belly portion and having an outer peripheral surface including a plurality of circumferentially spaced cavities, each having an edge portion adjoining said peripheral surface, whereby portions of the viscera can be compressed into said cavities and pulled away by said cavity edge portions as said cleaning wheel means rotates relative to the exposed belly portion; and
conveyor means for moving the shrimp past said cleaning wheel means.

42. Apparatus according to claim 41 wherein said peripheral surface of said cleaning wheel means has a generally convex, cross sectional shape with respect to the rotational axis of said cleaning wheel means and includes a radially outermost central portion and opposed arcuate side portions.

43. Apparatus according to claim 42 wherein said cleaning wheel means includes a row of said cavities located in said central portion of said peripheral surface.

44. Apparatus according to claim 42 wherein said cleaning wheel means includes a row of said cavities located in at least one of said side portions of said peripheral surface.

45. Apparatus according to claim 42 wherein said cleaning wheel means includes:
a first row of said cavities located in said central portion of said peripheral surface with the centers thereof located substantially on the peripheral center line of said cleaning wheel means,
a second row of said cavities located in one of said side portions of said peripheral surface, and
a third row of said cavities located in the other of said side portions of said peripheral surface.

46. Apparatus according to claim 45 wherein said cavities have a circular cross section.

* * * * *